United States Patent [19]

Kim, Jr.

[11] Patent Number: 4,731,220

[45] Date of Patent: Mar. 15, 1988

[54] NEUTRON REFLECTOR

[75] Inventor: Roy F. Kim, Jr., Ross Township, Allegheny County, Pa.

[73] Assignee: Westinghouse Electric Corp., Pittsburgh, Pa.

[21] Appl. No.: 765,466

[22] Filed: Aug. 14, 1985

[51] Int. Cl.⁴ ............................................. G21C 11/06
[52] U.S. Cl. .................................. 376/458; 376/399; 376/287
[58] Field of Search .............. 376/458, 459, 377, 389, 376/390, 399, 400, 287

[56] References Cited

U.S. PATENT DOCUMENTS 4,080,257  3/1978  Machado et al. .................. 376/400

FOREIGN PATENT DOCUMENTS 0059130  4/1982  European Pat. Off. .
2063022  8/1970  France .
2539244  1/1983  France .

Primary Examiner—John F. Terapane
Assistant Examiner—John S. Maples
Attorney, Agent, or Firm—D. C. Abeles

[57] ABSTRACT

Metallic reflector units supported solely by the core barrel substantially fill the annular spaces between the vertically spaced former plates which traverse the irregular space between the fuel assembly array and the core barrel in a pressurized water reactor. The support for each reflector unit comprises a pin extending radially outward along an extended line passing through the center of the metallic mass to support the vertical loads, and four elongated bolts in a rectangular pattern centered on the pin to resist overturning moments induced by seismic loads. The elongated bolts engage the core barrel and the bottoms of bores in the reflector units so that the bolts are free to bend to accommodate for thermal expansion of the reflector unit in all directions from the pin.

9 Claims, 5 Drawing Figures

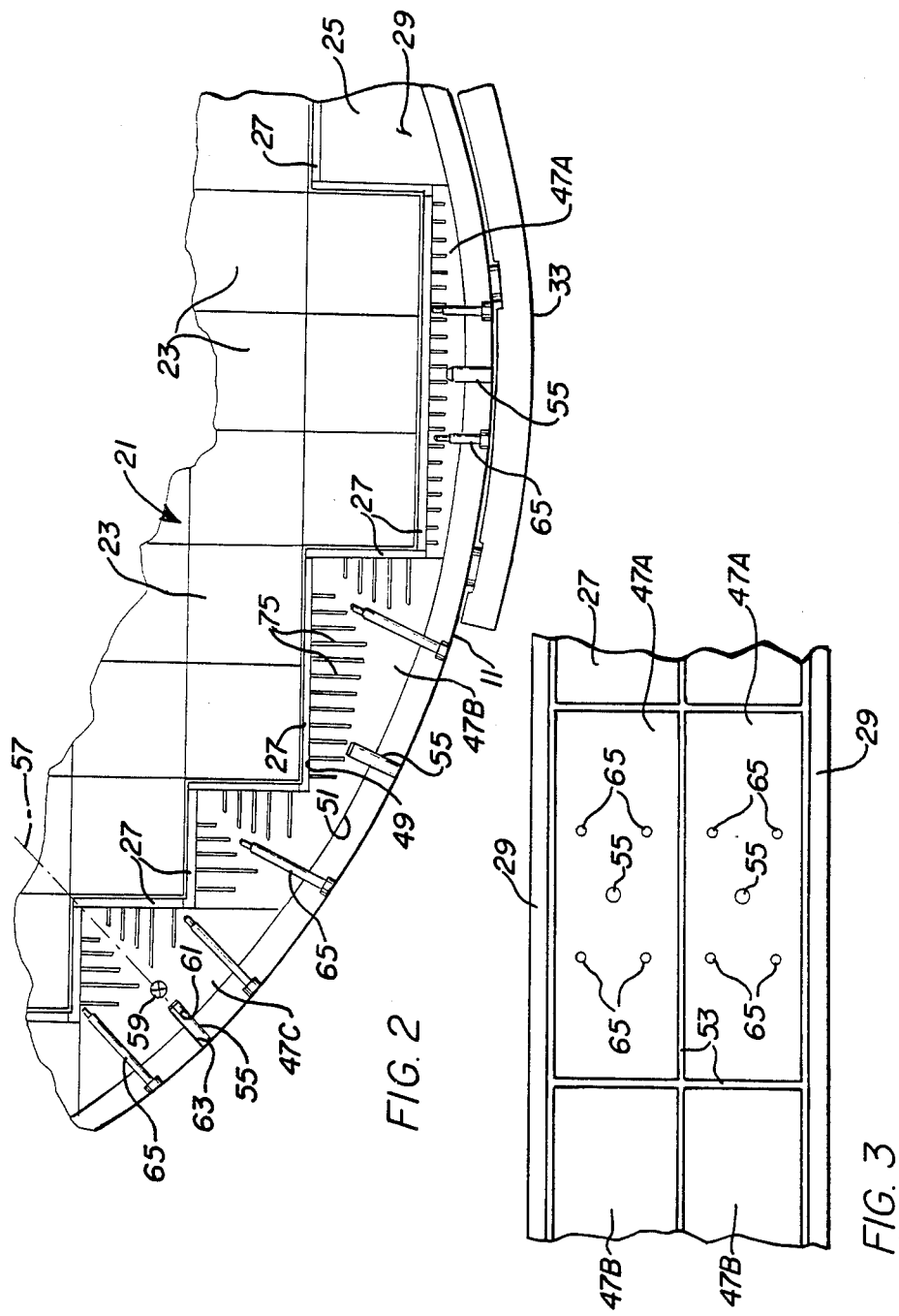

NEUTRON REFLECTOR

CROSS-REFERENCE TO RELATED APPLICATION

Commonly owned U.S. patent application Ser. No. 670,732 filed on Nov. 13, 1984 and entitled "Modular Radial Neutron Reflector".

BACKGROUND OF THE INVENTION

1. Field of the Invention

This invention is directed to metallic devices inserted in the irregular space between the periphery of the array of rectangular fuel assemblies forming the core of a nuclear reactor and the cylindrical core barrel surrounding the core for reflecting neutrons back to the peripheral fuel assemblies to thereby raise their efficiency. More particularly, it is directed to neutron reflectors which fit between the former plates commonly found in this irregular space in existing reactors and are secured to the core barrel by a mounting which accommodates for thermal expansion of the metallic mass in all axes.

2. Prior Art

In a commercial nuclear reactor, the fissionable material is contained in square, elongated fuel assemblies which are massed to form a generally cylindrical core. The core is housed inside a cylindrical, stainless steel core barrel between horizontal upper and lower stainless steel core plates. This entire assembly is mounted inside a cylindrical pressure vessel with hemispherical upper and lower heads. Reactor coolant, introduced into the pressure vessel through inlet nozzles, flows downward in the annular space between the core barrel and pressure vessel, reverses direction, flows upward through openings in the lower core plate, and through the fuel assemblies where it is heated as a result of fission reactions before being directed radially out of the pressure vessel through outlet nozzles.

Since the fuel assemblies are square in cross-section, an irregular space exists between the periphery of the core and the inner surface of the core barrel. The usual practice is to place longitudinally extending flat plates along the outer surfaces of the fuel assemblies to confine the upward coolant flow to the fuel assemblies. These plates are held in place by horizontal, irregularity shaped, former plates bolted to the longitudinal plates and to the core barrel. Holes in the former plates permit limited coolant flow in the generally annular space between the longitudinal plates and the core barrel to provide cooling for these components and to equalize the pressure on both sides of the longitudinal plates.

Although the original purpose of the vertical plates was to channel reactor coolant flow through the fuel assemblies, it has been recognized that to some extent, they also reflect neutrons back toward the peripheral fuel assemblies. However, since these plates are relatively thin, most of the neutrons escaping radially from the core migrate into the large volume of water between the plates which absorbs or thermalizes the neutrons with very little reflection.

It has subsequently been recognized in commonly owned U.S. patent application Ser. No. 576,655 filed on Feb. 3, 1984, that replacement of the water in the space between the core and the core barrel with essentially non-hydrogen containing materials results in much more efficient radial neutron reflection. Specifically, it is suggested that this space can be filled with vertically stacked, generally annular, stainless steel plates cooled by reactor coolant circulated through a few widely spaced vertical bores or a number of elongated metal cans arranged around the periphery of the core. These cans may contain either blocks of zirconia or stainless steel, again, with vertical cooling ports, or a number or rods supported at several levels by horizontal plates. These rods are either solid stainless steel or zirconia discs encassed in zircalloy. In all cases, the weight of the reflector units is supported by the lower core plate and the assemblies are held in place by securing them to the upper and lower core plates.

Commonly owned U.S. patent application Ser. No. 670,732 filed on Nov. 13, 1984, discloses removable, modular neutron reflectors each comprising a metallic box in which an array of closely packed steel rods is suspended. The interstices between the closely packed rods form passages for reactor coolant to circulate and comprise about 8–10% of the volume so that 90–92% of each module is metallic material. Each module is suspended in the irregular space between the fuel assemblies and the core barrel by a single point mounting on the core barrel which allows for free radial, circumferential and longitudinal thermal expansion of the module. The single point mounting comprises four closely spaced bolts torqued to clamp the module near its upper end to the core barrel. A large pin at the center of the pattern of bolts fixes the position of the module and serves as a redundant support. Each of the modules extends along the full height of the reactor core with lateral displacement of the lower end being restrained by a downwardly extending pin which slides in a vertical bore in the lower core plate.

While these reflector units are effective and have their own advantages, they all extend the full length of the reactor core and thus, require a major modification to the reactor internal design. There is a need for neutron reflector units which substantially fill the irregular space between the fuel assemblies and the core barrel with neutron reflecting material without requiring removal of the former plates or other modifications to the internals.

SUMMARY OF THE INVENTION

In accordance with the invention, neutron reflector apparatus for the generally annular spaces formed between the vertically spaced former plates that traverse the irregular space between the generally cylindrical array of elongated rectilinear fuel assemblies in a nuclear reactor and the cylindrical core barrel surrounding the array, comprises a plurality of metallic reflector units which together, substantially fill the generally annular spaces, with each unit extending angularly through a sector of an annular space. Each reflector unit is individually mounted on and solely supported by the core barrel. The reflector units are sized and spaced such that they are free to thermally expand in all directions from the mounting which comprises a dowel radially aligned with the extended line passing through the center of mass of the reflector unit for supporting the weight of the reflector unit, and at least one, but preferably a plurality, of elongated fasteners spaced about the dowel for resisting overturning moments. The elongated fasteners engage the core barrel and the bottoms of bores in the reflector units such that they are free to bend in response to thermal expansion. The reflector units are provided with vertical bores, or slits along the inner surfaces, which form passages for reactor coolant.

BRIEF DESCRIPTION OF THE DRAWINGS

A full understanding of the invention can be gained from the following description when read in conjunction with the accompanying drawings in which:

FIG. 2 is a plan view through a section of the reactor of FIG. 1;

FIG. 3 is an elevation view of a portion of the reactor shown in FIG. 2 with the core barrel removed;

DESCRIPTION OF THE PREFERRED EMBODIMENTS

Figure 1:
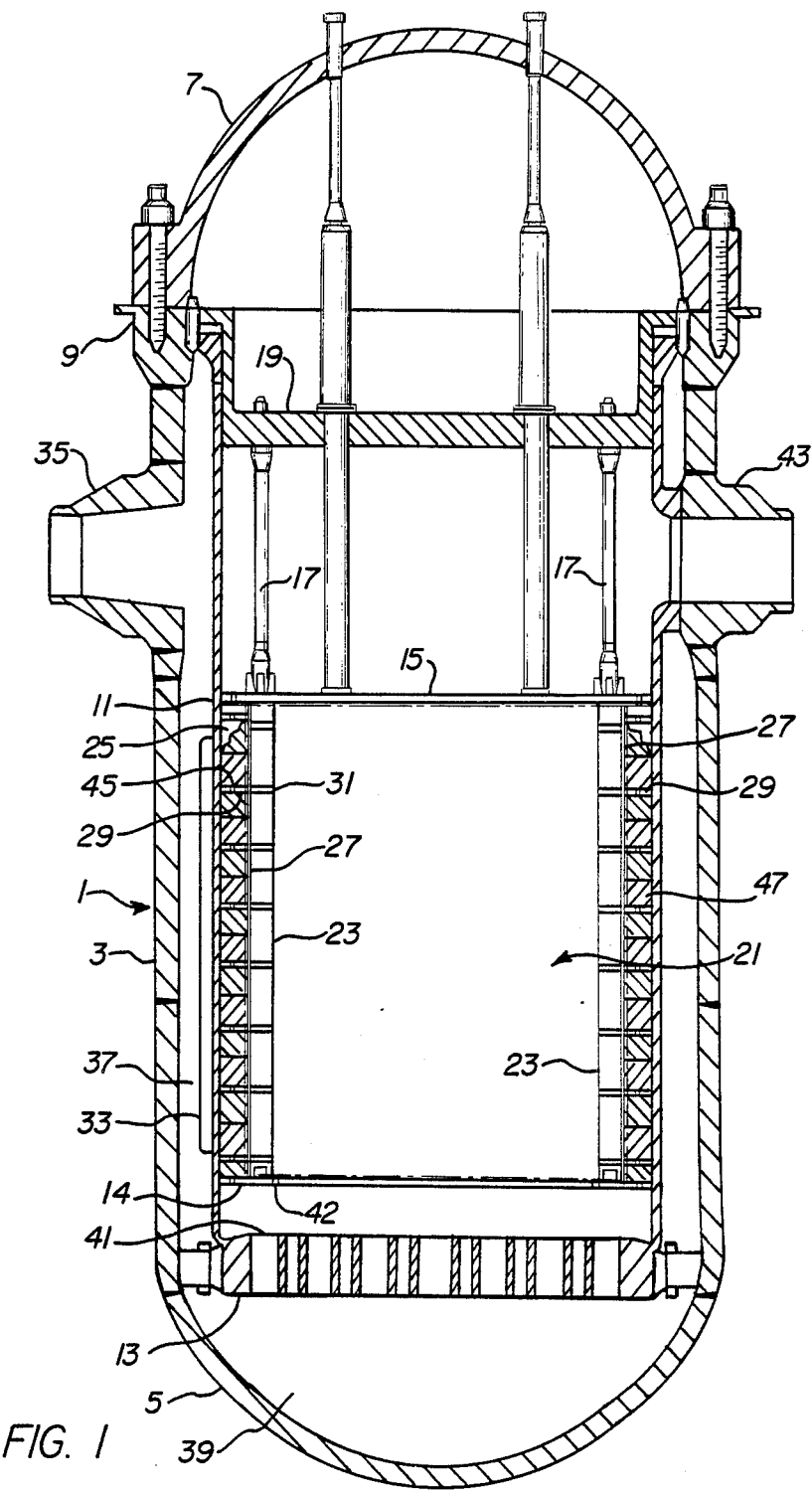
FIG. 1 is a vertical section through a pressurized water reactor incorporating the invention.

The invention will be described as applied to a pressurized water reactor (PWR) but it is to be realized that the invention could also be applied to other water reactors. The typical PWR shown in FIG. 1 includes a pressure vessel 1 having a cylindrical shell course 3, a hemispherical lower head 5 welded to the shell course and a removable, hemispherical head 7 bolted to a flange 9 at the upper end of the center section. A cylindrical stainless steel core barrel 11 is suspended inside the pressure vessel from the flange 9. The lower end of the core barrel 11 is connected to a core support plate 13 which, in turn, is slidably connected to the lower end of the cylindrical section 3 of the pressure vessel. An upper core plate 15 is suspended by a number of columns 17 (only two shown) from an upper support 19 which also rests on the flange 9. A lower core plate 14 is attached to the core barrel and core support columns.

The reactor core 21 is housed inside the core barrel 11 between the upper and lower core plates 14 and 15. The core 21 comprises an array of square elongated fuel assemblies 23, only two of which are shown in FIG. 1 for clarity. As can be seen best from FIG. 2, an irregular annular space 25 is created between the generally cylindrical array of square fuel assemblies 23 which make up the core 21 and the cylindrical core barrel 11. Elongated baffle plates 27 close off the fuel assemblies from this annular space 25 and horizontal, irregular formers 29 bolted to the core barrel 11 support the baffle plates 27. In general, the formers 29 are aligned with the grids 31 supporting the fuel rods (not shown) which make up the fuel assemblies 23. Neutron shields 33 are mounted on the outside of the core barrel 11 in the areas where the core 21 comes closest to the core barrel.

Reactor coolant is introduced into the pressure vessel 1 through an inlet nozzle 35. It flows downward through a downcomer 37 formed by the cylindrical section 3 and core barrel 11 to the lower hemispherical section 39, reverses direction and passes upward through apertures 41 and 42 in the core support plate 13 and the lower core plate 14, through the fuel assemblies 23, where it is heated by the fission reactions, and passes outward through an outlet nozzle 43. Typically, a PWR provides heated coolant to two to four steam generators (not shown) so that there is an inlet nozzle 35 and an outlet nozzle 43 for each steam generator loop. Apertures 45 are also provided in the formers 29 so that some coolant flows upward through the annular space 25 to provide cooling and to equalize the pressure on both sides of the baffle plates 27.

Figure 5:
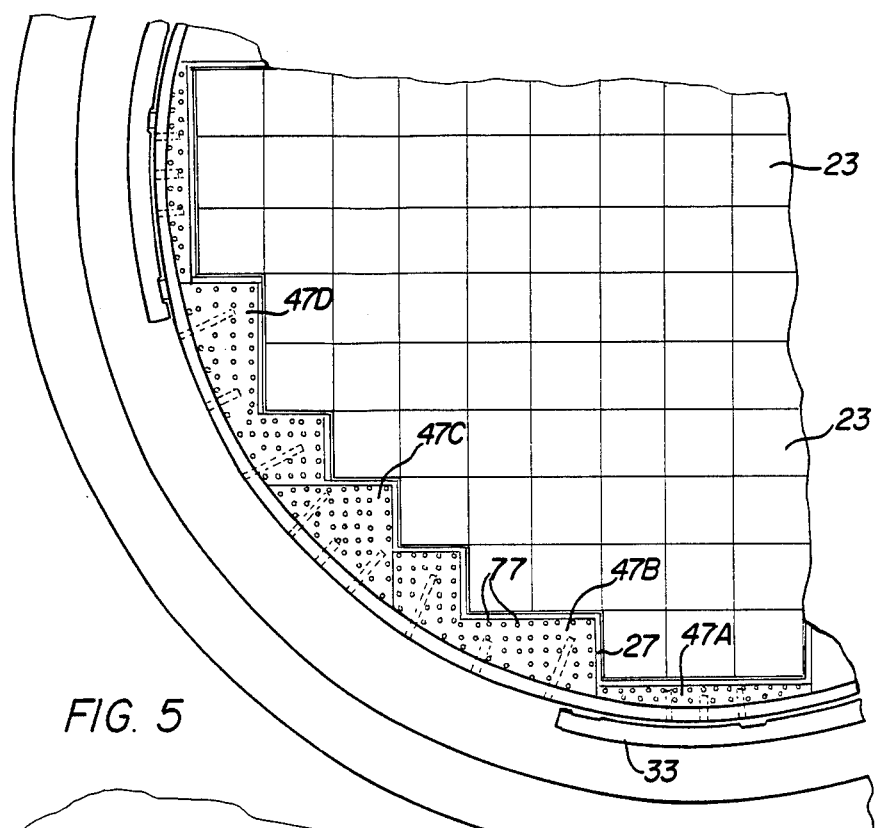
FIG. 5 is a plan view similar to FIG. 2 of a modified form of the invention.

In accordance with the invention, the irregular annular space 25 between the core barrel 11 and core 21 which is divided horizontally into sections by the formers 29 is substantially filled with a plurality of reflector units 47. Each reflector unit is a steel forging which extends angularly through a sector of the annular space 25. The inner contour of the forging comprises one or more planar faces 49 complimentary to the confronting baffle plates 27. The outer contour 51 conforms to the curvature of the inner surface of the core barrel 11. As can be seen from FIGS. 2 and 5, four basic configurations 47A, B, C and D of the reflector units are required to accommodate the irregular steps in the contour of the core 21. While only one quadrant of the pressure vessel is shown in FIG. 5, it can be appreciated that the same pattern is repeated in each of the other quadrants. As can be realized from FIG. 5, the same forging can be used for the reflector units 47B and D merely by turning it over about a transverse horizontal axis. The number and shapes of different reflector units required for any particular reactor is dependent upon the stepped contour of the core.

In order to make the size of the reflector units more managable for fabrication and installation, it is preferred that two vertically spaced rows of reflector units be installed between adjacent former plates which in a typical PWR, are about 18 to 20 inches apart. The reflector units 47 are sized, however, so that there is spacing 53 between units and between the units and the former plates. This spacing 53 is exaggerated in the FIG. 3 for illustrative purposes and is in fact only on the order of a few thousandths of an inch; an amount sufficient to permit free thermal expansion of the components.

Each of the reflector units 47 is individually mounted to and supported by the core barrel 11. The vertical load is supported by a large diameter pin 55 which extends radially outward along an extended line 57 which passes through the center of mass 59 of the forging as shown by way of example in connection with reflector unit 47C in FIG. 2. The pin 55 may be integrally formed on the forging, or preferably is fabricated from a harder steel and press fit into a bore 61 in the forging. This pin 55, which is also press fit into a bore 63 in the core barrel, not only supports the weight of the reflector unit but also takes the vertical seismic loading.

Figure 4:
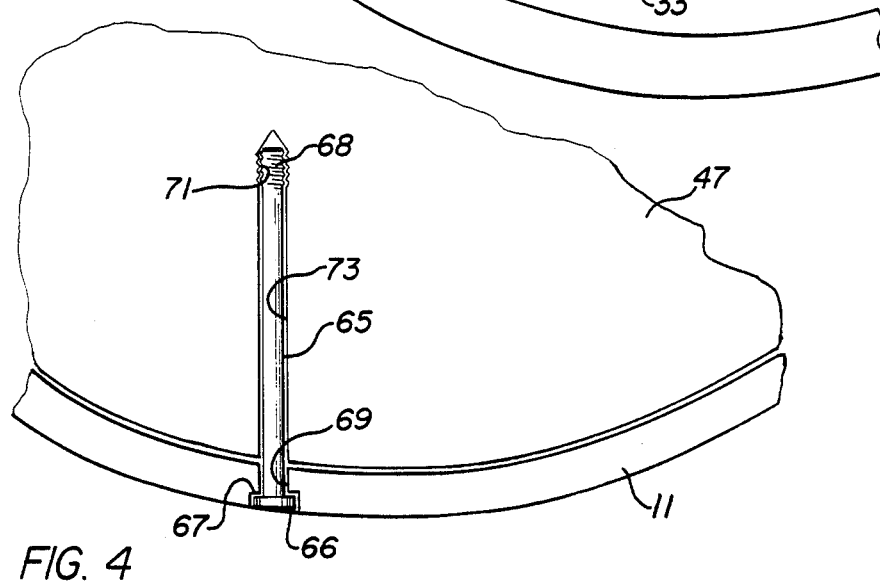
FIG. 4 is an enlargement of a portion of FIG. 2.

Overturning moments about the pin 55 are resisted by a pattern of elongated bolts 65 spaced around the pin. In a preferred form shown in FIG. 3, four bolts 65 are arranged in a rectangular pattern centered on the pin 55. As best seen in FIG. 4, each of the bolts 65 has a head 66 which seats on a shoulder 67 formed by a countersink in a bore 69 in the core barrel 11 and a shaft which extends to a threaded end 68 which engages the threaded terminal portion 71 of a bore 73 in the associated reflector unit 47. The bores 69 and 73 are larger in diameter than the shafts of the bolts 65 such that the bolts are free to bend in response to differences in thermal expansion between the bore barrel 11 and the reflector units 47.

Passages are provided in the reflector unit 47 for the flow of reactor coolant in the form of vertically extending slits 75 in the faces of the unit confronting the core 21. The slits are sized and spaced to minimize the temperature gradient across the reflector unit taking into account that radiation heating is more intense adjacent the core 21. The slits comprise about 8% to 10% of the total volume for the reflector unit 47 so that approximately 90% to 92% of the volume is steel. As shown in FIG. 5, the slits may be replaced by vertical bores 77 through the reflector units 47. In either case, the passages 75 or 77 in vertically adjacent reflector units 47 are vertically aligned to permit free passage of reactor coolant therethrough.

In accordance with the invention, each reflector unit 47 is separately mounted on the core barrel 11. They are not stacked one upon the other and they do not apply any load to the formers 29 or to the baffle plates 27. They may be installed during manufacture of the reactor without requiring basic changes in the internal construction of the reactor vessel and are therefore ideal for application to standard design reactor internals.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Neutron reflector apparatus for the generally annular spaces formed between vertically spaced former plates traversing the irregular space between a generally cylindrical array of elongated rectilinear fuel assemblies in a nuclear reactor and a cylindrical core barrel surrounding the array, said apparatus comprising:
   a plurality of reflector units which together substantially fill said generally annular spaces, each unit extending angularly through a sector of an annular space and comprising a metallic mass; and
   mounting means for each reflector unit comprising a pin extending substantially radially outward from each reflector unit substantially along an extended radial line passing through the center of mass of the unit and secured to the core barrel to support the weight of said reflector unit, said reflector units being sized and spaced such that they are free to expand in all directions from said pin, said mounting means further including fastener means for connecting the reflector unit to the core barrel at at least one point spaced from said pin to resist overturning moments about said pin while allowing said free thermal expansion of the reflector unit relative to the core barrel between said pin and said fastener means.

2. The apparatus of claim 1 wherein said fastener means comprises at least one elongated fastener, wherein said reflector units each define at least one bore extending inward into the metallic mass from the core barrel and terminating in a terminal portion spaced from the core barrel and wherein said at least one elongated fastener engages the core barrel and the terminal portion of such bore such that said elongated fastener is free to bend in response to differences in thermal expansion between the core barrel and said reflector units.

3. The apparatus of claim 2 wherein each reflector unit comprises a plurality of bores spaced about said pin and extending inward into the metallic mass from the core barrel and terminating in a threaded terminal portion spaced from the core barrel and wherein said fastener means includes a plurality of bolts having a head which engages the core barrel and a threaded end which engages threads in the terminal portion of one of said bores.

4. The apparatus of claim 3 wherein said reflector units define four of said bores spaced in a rectangular pattern centered on said pin and wherein said plurality of bolts includes a bolt engaging said core barrel and threaded into each of said four bores.

5. Neutron reflector apparatus for the generally annular spaces formed between vertically spaced former plates traversing the irregular space between a generally cylindrical array of elongated square fuel assemblies in a nuclear reactor and a cylindrical core barrel surrounding the array, said apparatus comprising:
   a plurality of reflector units which together substantially fill said generally annular spaces, each unit extending angularly through a sector of an annular space and comprising a metallic mass; and
   mounting means for each reflector unit comprising a pin extending substantially radially outward from each reflector unit substantially along an extended radial line passing through the center of mass of the reflector unit and secured to the core barrel to support the weight of said reflector unit, said pin being sized to support the vertical loading imposed by seismic forces on the reflector unit, said reflector units being sized and spaced such that they are free to thermally expand in all directions from said pin, said mounting means further including a plurality of bores defined by each reflector unit spaced about said pin and extending inward from the core barrel and terminating in terminal portions spaced from the core barrel, and a plurality of bolts engaging the core barrel and the terminal portions of the said bores to resist overturning moments about the pin while bending to allow free differential thermal expansion of the reflector unit relative to the core barrel between said pin and said fastener means.

6. The reflector apparatus of claim 5 wherein said plurality of bores are evenly spaced about said pin.

7. The reflector apparatus of claim 6 wherein there are four bores and associated bolts arranged in a rectangular pattern centered about said pin.

8. The apparatus of claim 5 wherein each of said reflector units defines a plurality of vertical passages through which reactor coolant passes to cool the unit.

9. The apparatus of claim 8 wherein said vertical passages are slits extending inward from a vertical face thereof which confronts the array of fuel assemblies.

* * * * *